Figure 1:
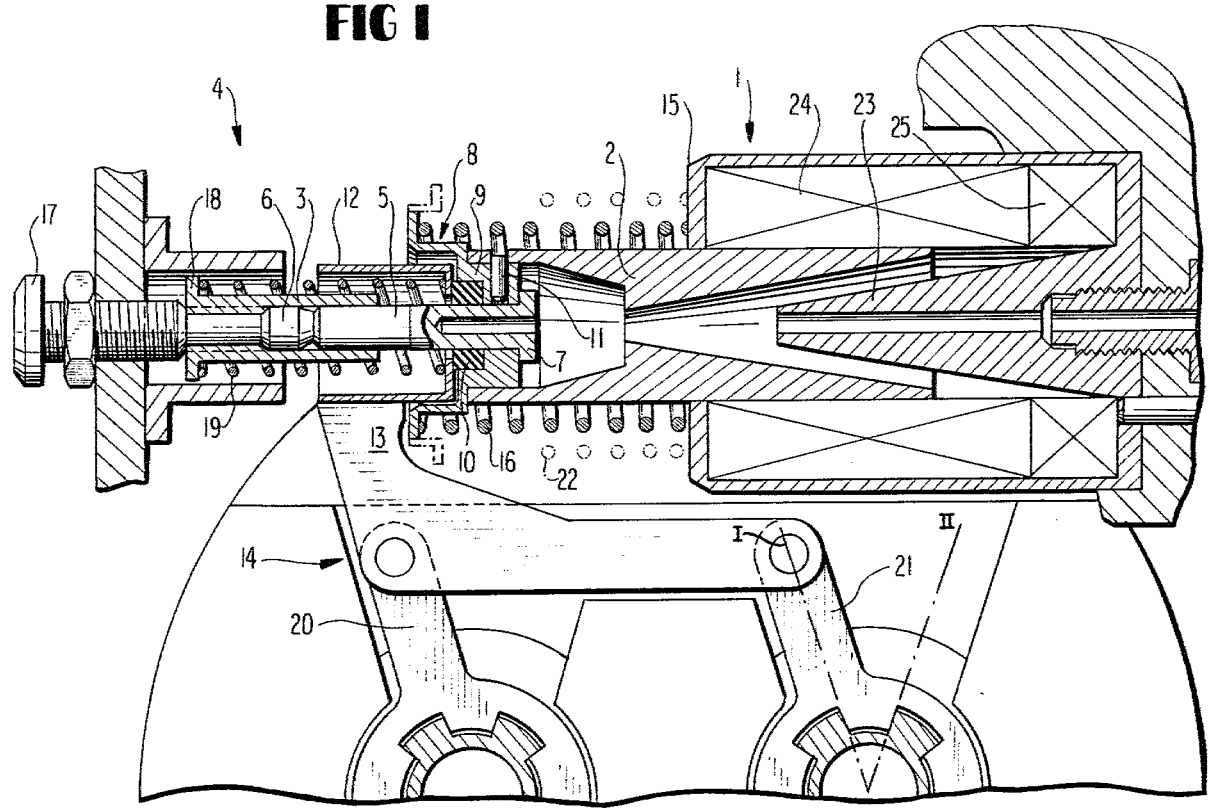

United States Patent [19]

Bruder et al.

[11] 4,245,596

[45] Jan. 20, 1981

[54] SHIFTING MEANS FOR ACTUATING VALVE TURN-OFF IN MULTI-CYLINDER INTERNAL COMBUSTION ENGINE

[75] Inventors: Werner Bruder, Remseck; Roland Merkle, Stuttgart, both of Fed. Rep. of Germany

[73] Assignee: Daimler-Benz Aktiengesellschaft, Fed. Rep. of Germany

[21] Appl. No.: 29,346

[22] Filed: Apr. 12, 1979

[30] Foreign Application Priority Data

Apr. 12, 1978 [DE] Fed. Rep. of Germany ....... 2815732

[51] Int. Cl.³ ............................................. F02D 13/06
[52] U.S. Cl. ............................. 123/198 F; 123/90.12; 123/90.15; 123/90.32
[58] Field of Search ............... 123/90.12, 90.15, 90.16, 123/90.32, 198 F

[56] References Cited

U.S. PATENT DOCUMENTS

| 4,151,817 | 5/1979 | Mueller | 123/198 F |
| 4,151,824 | 5/1979 | Gilbert | 123/198 F |
| 4,173,209 | 11/1979 | Jordan | 123/198 F |

FOREIGN PATENT DOCUMENTS 2725529  4/1978  Fed. Rep. of Germany ....... 123/198 F

*Primary Examiner*—Ira S. Lazarus
*Attorney, Agent, or Firm*—Craig & Antonelli

[57] ABSTRACT

A switching means for effecting a shutoff of valves of a multi-cylinder internal combustion engine wherein a servomechanism is provided which, upon a shutting off of the valves, acts upon an interposed energy storage arrangement in such a way that a spring-loaded leading mass of the energy storage arrangement, after a predetermined lead path, entrains an element connected with adjusting members for shutting off the valves.

16 Claims, 2 Drawing Figures

U.S. Patent   Jan. 20, 1981   4,245,596

SHIFTING MEANS FOR ACTUATING VALVE TURN-OFF IN MULTI-CYLINDER INTERNAL COMBUSTION ENGINE

The present invention relates to a switching arrangement and, more particularly, to a switching means for actuating a valve shutoff in a multi-cylinder internal combustion engine.

It has been proposed to block a fuel supply to the internal combustion engine and also to temporarily deactivate or disconnect gas changeover valves of individual cylinders of the engine especially during partial load operation of, for example, a six-cylinder, eight-cylinder, or other multi-cylinder internal combustion engines for the purpose of optimizing fuel consumption.

The control of the valve shutoff, as well as the reconnection of the valves, normally is effected by suitable electronic control means which are adapted to process control pulses dependent on the cam angle as derived from the cam shaft of the internal combustion engine by appropriate pulse generators or the like.

It is also possible to affect the operation of associated servomechanisms in the above-described manner with the servomechanisms in turn, being adapted to disconnect or connect certain gas changeover valves by way of suitable adjusting means.

The aim underlying the present invention essentially resides in providing a switching means for actuating a valve shutoff arrangement whereby it is possible to effect very brief shutoff times for the respective gas changeover or exchange valves.

According to advantageous features of the present invention, a servomechanism or auxiliary power device is provided which, during a shutoff of the respective valves, acts on an interposed energy storage means which includes a spring-loaded leading or counterrecoil mass, in such a way that the mass entrains, after a certain lead distance, an element connected to adjusting members for shutting off the respective valves.

Advantageously, in accordance with the present invention, the servomechanism may include an electromagnet.

In accordance with the present invention, the counterrecoil mass may consist of a tubularly shaped hammer which, upon a shutoff of the valves, impinges on an element which acts as an anvil.

By virtue of the above-noted measures in accordance with the present invention, it is possible to obtain very brief shutoff times which are necessary, particularly in a case of valve shutoff operations wherein the inlet valve as well as the outlet valve of the respective cylinders are simultaneously shut off.

In accordance with the present invention, the element which functions as an anvil is formed so as to partially surround the hammer in a cup-like manner with a perforation being provided in the cup-shaped bottom wherein a connecting fastener such as a screw is provided in a longitudinally displaceable fashion with the screw being firmly connected with an armature of the electromagnet and with the hammer.

In accordance with a further development of the present invention, the hammer, guided within a cylindrical-shaped member can be provided with a collar with a slightly pretensioned compression spring being arranged between the collar and the cup-shaped bottom of the anvil element. The compression spring is effective so as to retain the anvil element in the starting position.

In order to obtain a simple and secure connection between the hammer and the connecting fastener and to also obtain a variation in a distance by these parts, it is possible, in accordance with further features of the present invention, to threadably join the hammer and the connecting fastener and to fix the hammer and connecting fastener in an adjusted position by means of a counter nut.

Advantageously, according to the present invention, the connecting screw may be firmly surrounded by a plastic-like buffer which serves, when the valve is connected and also when the valve is disconnected, as an abutment for both switching positions of the anvil element.

In accordance with yet further features of the present invention, at least one compression spring may be arranged between a housing of the magnet and a spring plate firmly joined to the armature with the compression spring retaining the anvil, which is in contact with an adjustable stop, in one switching position, "valve connected". The spring force characteristic of the last-mentioned compression spring would be constructed so as to be far greater than the spring force of the compression spring which surrounds the hammer.

Additionally, in accordance with the present invention, the servomechanism may include, in addition to the electromagnet, a hydraulic unit with a spool valve operable by the electromagnet by means of which a hydraulic piston, connected thereafter, which is firmly joined to the hammer, can be actuated.

To provide for a simple arrangement to effect an operation of the energy storage means, according to the present invention, the hydraulic piston may be fixedly connected to the hammer by way of a pull rod or the like.

Moreover, a spacer sleeve, contacting the hydraulic piston, may be firmly pushed onto the pull rod in accordance with the present invention in order to provide the anvil element with two defined switching positions for the valve shutoff and valve connection. The spacer sleeve may be provided, at an end face thereof, with a disk-like buffer which serves as a stop for the anvil element when the valve is shutoff as well as when the valve is connected.

According to the present invention, a compression spring may be arranged between the anvil element and the collar of the hammer with the spring urging the anvil element against the buffer when the associated valve is connected.

In order to provide for an alternate actuation of the hydraulic piston, in accordance with still further features of the present invention, the spool valve, depending on its positioning, may be adapted to connect a feed duct with a chamber lying in front of the hydraulic piston and a discharge duct with a chamber of a hydraulic cylinder, which chamber lies behind the hydraulic piston or establishes a converse connection.

Accordingly, it is an object of the present invention to provide a switching means for a valve shutoff arrangement of a multi-cylinder internal combustion engine which avoids, by simple means, shortcomings and disadvantages encountered in the prior art.

Another object of the present invention resides in providing a switching means for actuating a valve shutoff arrangement of an internal combustion engine whereby it is possible to effect very brief shutoff times for the respective valves of the engine.

A further object of the present invention resides in providing a switching means for actuating a valve shutoff arrangement for internal combustion engines which is simple in construction and therefore relatively inexpensive to manufacture.

Yet another object of the present invention resides in providing a switching means for actuating a valve shutoff arrangement of an internal combustion engine which functions reliably under all operating conditions.

A still further object of the present invention resides in providing a switching means for actuating a valve shutoff arrangement of a six-cylinder, eight-cylinder, or other multi-cylinder internal combustion engine.

Figure 2:
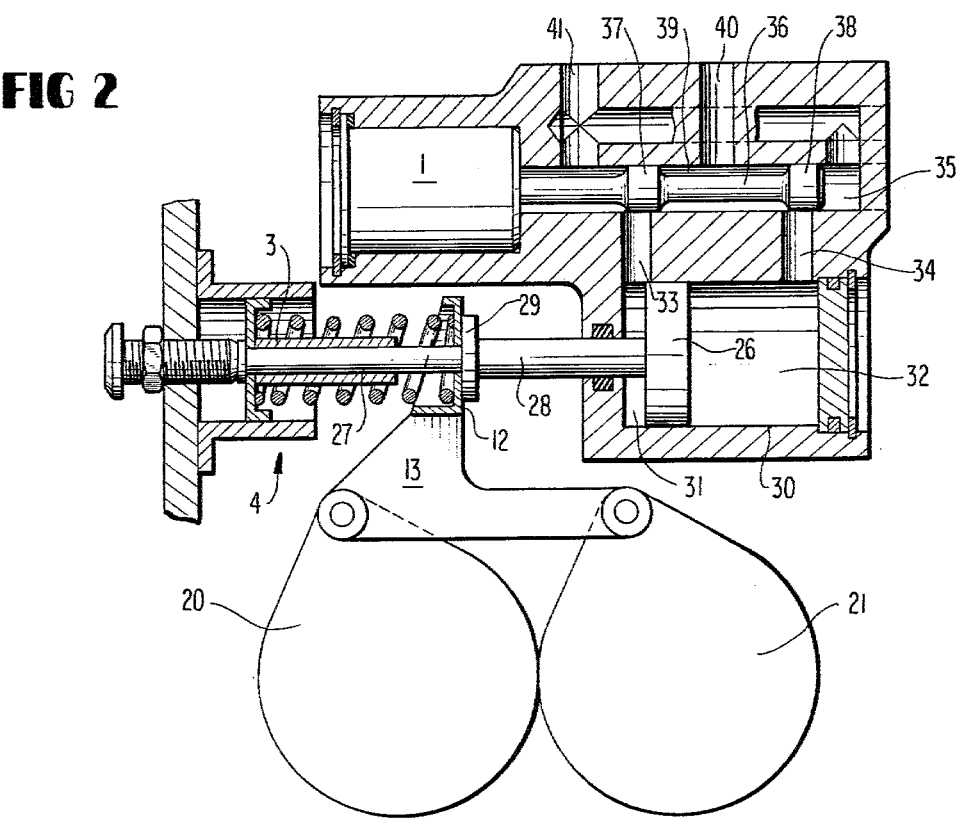

These and other objects, features, and advantages of the present invention will become more apparent from the following description when taken in connection with the accompanying drawings which show, for the purposes of illustration only, two embodiments in accordance with the present invention, and wherein:

FIG. 1 is a cross-sectional view of a first embodiment of a switching means in accordance with the present invention wherein an energy storage means is operable by an electromagnet to which is connected adjusting members for a valve shutoff arrangement; and FIG. 2 is a cross-sectional view of a second embodiment of a switching arrangement for actuating a valve shutoff arrangement in accordance with the present invention wherein energy storage means are operable by a magneto-hydraulic switching means.

Referring now to the drawings wherein like reference numerals are used in both views to designate like parts and, more particularly, to FIG. 1, according to this figure, a servomechanism is provided for shutting off the inlet and outlet valves of a six-cylinder, eight-cylinder, or other multi-cylinder internal combustion engine with the servomechanism including an electromagnet generally designated by the reference numeral 1 having a piston armature 2 which is firmly connected to a counterrecoil mass 3 of an energy storage means 4.

The counterrecoil mass 3 includes a tubular hammer portion threadably joined to a connecting fastener such as a screw 5 and connected for rotation with the screw 5 by means of a counter screw 6 threadably inserted into the hammer. A spring plate generally designated by the reference numeral 8 is pushed onto the connecting screw 5 with the spring plate 8 being contacted by a head 7 of a further fastener such as a screw. The spring plate 8 is constructed as a staggered element with a synthetic resin buffer 10 being interposed between a step 9 of the spring plate 8 and the connecting screw 5. A locking pin 11 is provided for connecting the spring plate 8 and the piston armature 2 for joint rotation.

A spring loaded anvil element 12 surrounds the connecting screw 5 and the hammer 3 with the anvil element 12 being of a cup-shaped configuration. The anvil element 12 rests on the synthetic resin buffer 10 and an adjusting member 13 of a quadrilateral bell crank linkage 14 is attached to the anvil element 12.

The hammer 3 is retained in a starting position by a recoil spring 16 having one end supported against the spring plate 8 and the other end supported against a housing 15 of the electromagnet 1. In the starting position, the hammer 3 contacts an adjustable screw 17 which is adapted to serve as an abutment.

A compression spring 19 having a smaller spring force rests on a collar 18 of the hammer 3. The compression spring 19 is provided for maintaining the anvil element 12 in constant contact with the synthetic resin buffer 10 when the valve arrangement associated with the switching mechanism is connected.

As soon as the electromagnet 1 is energized, the hammer 3, connected with the piston armature 2, is set into motion. After a predetermined lead time and a predetermined lead path, the hammer 3 impinges on the anvil element 12 and transmits its own velocity in accordance with the law of impulse transmission to adjusting members 13, 20, 21 of the quadrilateral bell crank linkage 14. The impulse is initiated at a point in time when the last of the two tappets enters a base circle of the cam of the cam shaft of the engine.

The compression spring 19, tensioned to a maximum force during the lead time, supports the impulse transmission so that the entire shutoff distance is traversed at almost full impulse velocity. At the same time, while this process is taking place, the recoil spring 16 is tensioned.

To initially counteract only a small recoil spring force, it is possible to provide a second recoil spring 22, illustrated in phantom lines in FIG. 1, with the second recoil spring 22 being tensioned only after about half of the lead distance has been traversed. The second recoil spring 22 is merely mounted unilaterally.

At the beginning of the impulse transmission, the inlet and outlet valves are shut off by way of the rotatable adjusting members 20, 21 or adjusting levers articulated to the adjusting member and acting as coupling elements on the tappet control.

When the electromagnet 1 is deactivated, the adjusting levers 20, 21, due to the force of the recoil spring 16, pivot from a switching position II back into a switching position I so that the associated valves are reconnected.

A coil core 23 of the electromagnet 1 is provided with a conical shape with the piston armature 2 having a corresponding conical recess so as to attain a maximally uniform armature force over the entire stroke of the piston armature 2.

Additionally, to relieve the electromagnet 1 electrically and/or thermally, a primary magnet 24 is deactivated in the switching position II, wherein the associated valves are shut off, and simultaneously a low-load restraining coil 25 is electrically connected.

The control of the switching means may be effected by providing a suitable conventional electronic control means (not shown) which is adapted to receive control pulses from, for example, pulse generators arranged so as to be operatively associated with the cam shaft of the internal combustion engine with the control pulses being dependent on the cam angle derived from the cam shaft.

The power or force necessary to effect a shutting off of the valves can, as shown in FIG. 2, be achieved by providing a bilaterally acting hydraulic piston 26 which is controlled in a magneto-hydraulic way. A spacer sleeve 28 having a disk-shaped buffer collar or abutment 29 is firmly pushed onto the piston or pull rod 27 of the hydraulic piston 26. A tubular hammer 3, acting as a leading mass, is threadably connected at a free end of the piston rod 27. The other individual components of the energy storage means are at least approximately identical in structure with those discussed hereinabove in connection with FIG. 1.

The piston 26 is disposed in a hydraulic cylinder so as to form two working chambers or pressure spaces 31, 32. The working chambers 31, 32 are in communication with a cylindrical bore or recess 35 by way of connecting ducts or bores 33, 34. A valve spool 36 is guided in the bore 34 so as to be longitudinally displaceable therein with the valve spool 36 being connected to the electromagnet 1. The valve spool 36 is provided with two collars 37, 38 which define therebetween a sealed annular chamber 39.

A feed duct 40 terminates in the annular chamber 39 with the feed duct 40 being adapted to be brought into communication with either the connecting duct 33 or connecting duct 34 in dependence upon the positioning of the valve spool 36 by the electromagnet 1.

As can be seen from the positioning of the valve spool 36 in FIG. 2, the chamber 32 is under the effect of a hydraulic pressure while the chamber 31 is vented or without pressure, since the connecting duct 33 is in communication with a discharge duct 41 by way of the cylindrical bore 35.

Once the electromagnet 1 is energized, the valve spool 36 is attracted and the working chamber 31 is then placed under pressure so that the hydraulic piston 26 is displaced to the other final position. In such position, the working chamber 32 is vented or is without hydraulic pressure since the connecting duct 33 is now in communication with the discharge duct 41.

The displacement of the respective elements in the energy storage means of FIG. 2 corresponds to the displacement described hereinabove in connection with the arrangement of FIG. 1.

To reconnect the valves which have been shut off, the electromagnet 1 is deactivated or deenergized so that the valve spool 36 again assumes the position illustrated in FIG. 2 and the same is true for the hydraulic piston 26, the anvil element 12, and the adjusting members 13, 20, 21 of the quadrilateral bell crank linkage 14.

While we have shown and described only two embodiments in accordance with the present invention, it is understood that the same is not limited thereto, but is susceptible to numerous changes and modifications as known to one having ordinary skill in the art, and we therefore do not wish to be limited to the details shown and described herein, but intend to cover all such changes and modifications as are encompassed by the scope of the appended claims.

We claim:

1. A switching means for effecting a shutoff of valves of a multi-cylinder internal combustion engine, characterized in that a servo means is provided, adjusting means are provided for adjusting positions of the valves between an active and a shutoff position, an energy storage means is interposed between the servo means and the adjusting means, the servo means being adapted to act upon the interposed energy storage means upon a shutting off of the valves, and in that the energy storage means includes a spring-loaded mass means adapted to entrain a member connected with the adjusting means after a displacement of a predetermined lead path.

2. A switching means according to claim 1, characterized in that the servo means includes an electromagnet means.

3. A switching means according to one of claims 1 or 2, characterized in that the mass means includes a tubular-shaped member which is adapted to impinge against the member connected with the adjusting means upon a shutting off of the valves.

4. A switching means according to claim 3, characterized in that the member connected to the adjusting means is constructed as a cup-shaped anvil element adapted to at least partially surround a portion of the tubular-shaped member, the anvil element includes a bottom portion in which is arranged an aperture means for longitudinally displaceably accommodating a fastening means, the fastening means is connected at one end with an armature of the electromagnet means and at the other end thereof with the tubular-shaped member.

5. A switching means according to claim 4, characterized in that the tubular-shaped member is provided with a collar means adapted to be guided in a cylinder, and in that a compression spring is arranged between the collar means and the bottom portion of the anvil element.

6. A switching means according to claim 5, characterized in that the tubular-shaped member and the fastening means are threadably connected to each other, and in that a counter-fastening means is provided for fixing the threaded connection between the tubular-shaped member and the fastening means.

7. A switching means according to claim 6, characterized in that a buffer means firmly surrounds at least a portion of the fastening means for providing an abutment surface for the anvil element when the valves are shut off and when the valves are active.

8. A switching means according to claim 7, characterized in that a spring plate means is fixedly connected to the armature of the electromagnet means, and in that at least one recoil spring means is arranged between the spring plate means and a housing of the electromagnet means for maintaining the tubular-shaped member in contact with an adjustable stop when the valves are active.

9. A switching means according to claim 3, characterized in that the servo means further includes a hydraulic means having a valve spool means actuatable by the electromagnet means, a hydraulic piston means is operatively connected with the tubular-shaped member with a position of the valve spool means determining a positioning of the hydraulic piston means.

10. A switching means according to claim 9, characterized in that the hydraulic piston means includes a piston rod, and in that the piston rod is connected with the tubular-shaped member.

11. A switching means according to claim 10, characterized in that a spacer sleeve means is disposed on the piston rod so as to have one end thereof in contact with a piston surface of the hydraulic piston means.

12. A switching means according to claim 11, characterized in that a second end of the spacer sleeve means is provided with a disk-shaped collar means adapted to serve as a stop for the member connected with the adjusting means when the valves are shut off and when the valves are active.

13. A switching means according to claim 12, characterized in that the member connected with the adjusting means is constructed as an anvil element, the tubular-shaped member includes a collar, a compression spring means is arranged between the anvil element and the collar of the tubular-shaped member for urging the anvil element against the disk-shaped collar means when the valves are active.

14. A switching means according to claim 13, characterized in that the valve spool means is displaceably arranged in a bore provided in a housing of the hydraulic means, the hydraulic piston means is arranged in a cylinder provided in the hydraulic means housing so as to form a first and a second working pressure chamber on respective sides of the hydraulic piston means, feed duct means are provided for supplying a hydraulic fluid to the hydraulic means, the feed duct means communicating with the bore accommodating the valve spool means, a discharge duct means is provided and communicates with the bore accommodating the valve spool means, means are provided for communicating the bore accommodating the valve spool means with the first and second working pressure chambers such that, in a first predetermined position of the valve spool means, the feed duct means is brought into communication with the first working pressure chamber while the second working pressure chamber is in communication with the discharge duct means, and, in a second predetermined position of the valve spool means, the feed duct means is brought into communication with the second working pressure chamber while the first working pressure chamber is brought into communication with the discharge duct means.

15. A switching means according to claim 2, characterized in that the servo means further includes a hydraulic means having a valve spool means adapted to be actuated by the electromagnet means, a hydraulic piston means is operatively connected with the mass means with a position of the valve spool means determining a positioning of the hydraulic piston means.

16. A switching means according to claim 2, characterized in that a compression spring is arranged between the member connected with the adjusting means and the mass means for urging the member against an abutment when the valves are active.

* * * * *